Patented Oct. 8, 1929

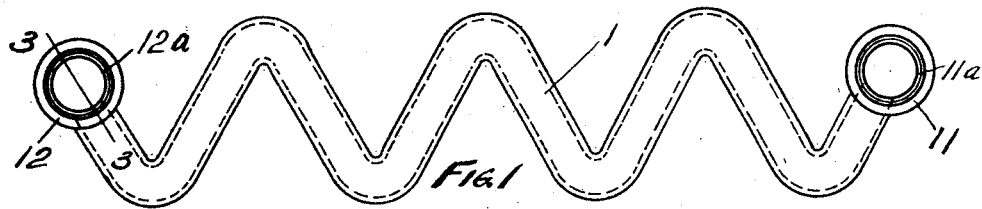
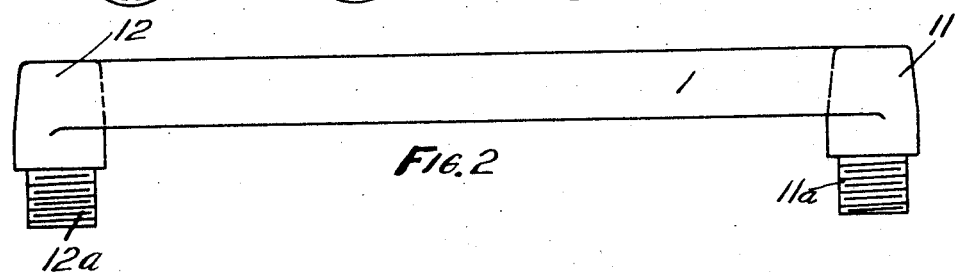
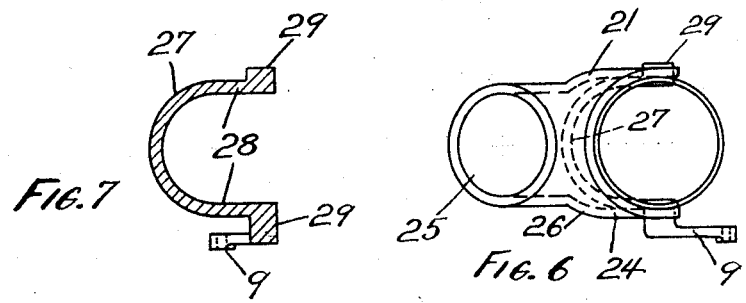
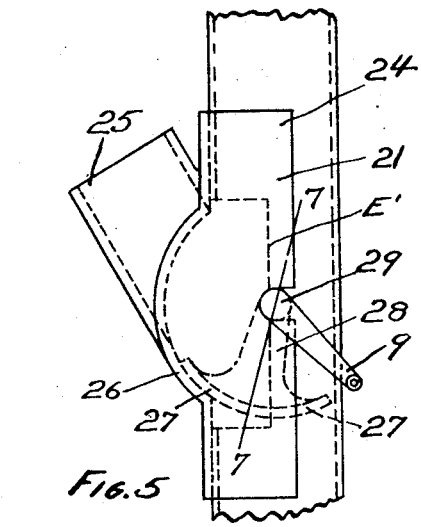

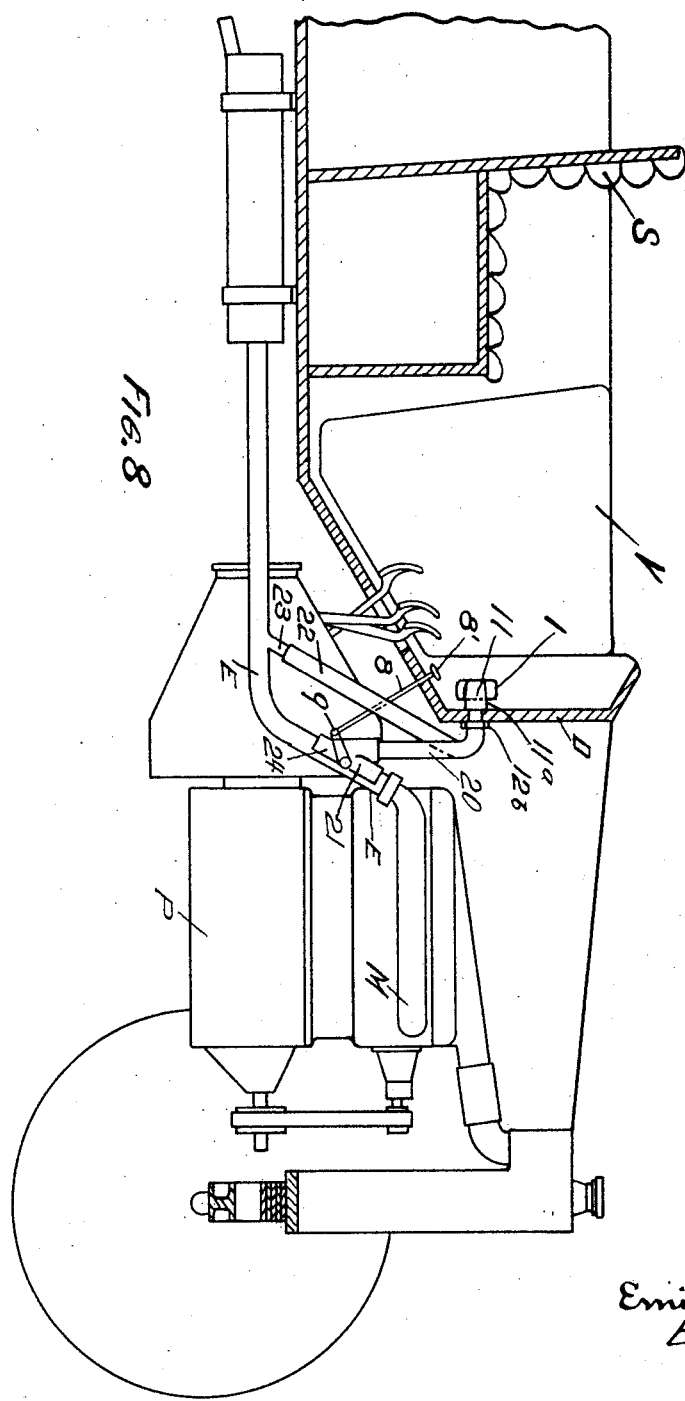

1,730,985

UNITED STATES PATENT OFFICE

EMIL VAN HOLLEN, OF ANOKA, MINNESOTA

EXHAUST-LINE CUT-OFF VALVE FOR AUTOMOBILE HEATERS

Application filed May 3, 1927. Serial No. 188,527.

This invention relates to certain improvements in automobile heaters and the nature and objects of the invention will be readily recognized and understood by those skilled in the art in the light of the following explanation and detailed description of the accompanying drawings illustrating what I at present consider to be the preferred embodiments or mechanical expressions of my invention from among various other forms, arrangements, combinations and constructions of which the invention is capable within the spirit and the scope thereof.

An object of the invention is to provide an automobile heater of the type utilizing the exhaust gases of the motor, which is so designed and arranged as to permit of its being mounted directly in an enclosed portion of an automobile without the necessity of providing separate casings or enclosures for the heater, thus eliminating parts and enabling the heater to radiate directly into the enclosed space in which mounted.

Another object of the invention is to provide an autombile heater of the type utilizing motor exhaust gases, with an efficient valve mechanism for directing the exhaust gases from the exhaust line to and through the heater while offering a minimum of resistance to the passage of the gases from the exhaust line.

A further object of the invention resides in providing such a valve mechanism for mounting in the motor exhaust line in such a manner that the exhaust line is unobstructed by the valve mounting, and the valve mounting is indirectly subjected to the high temperatures of the exhaust gases so as to eliminate possibility of injury to the valve mounting.

A further object of the invention is to provide an automobile heater of improved design and construction for utilizing the exhaust gases of a motor as the heating medium.

Another object of the invention is to provide a design and arrangement of coupling for mounting on a motor exhaust line and for connecting such line with a gas off-take lining for coupling with a heater, such mounting so designed as to operatively carry a valve for cutting off the exhaust line and directing the exhaust gases through the coupling into the line from the exhaust manifold to the heater.

A further object of the invention is to provide such a coupling so designed as to permit of its being readily mounted on and coupled to an exhaust line with a minimum of reconstruction of the exhaust line and with a minimum of time and labor.

With the foregoing general objects and certain other objects in view which will be readily recognized from the following description, the invention consists in certain novel features in construction and in combinations and arrangements of elements, as will be more fully and particularly referred to and specified hereinafter.

Referring to the accompanying drawings:

Fig. 1 is a view in side or front elevation of a heater of the invention.

Fig. 2 is a view in top plan of the heater of Fig. 1.

Fig. 3 is a detail section through one end of the heater taken on the line 3—3 of Fig 1 and showing the mounting of the heater on and to a vehicle dash board.

Fig. 4 is a view in end elevation of Fig. 3, a portion of the vehicle dash board being shown.

Fig. 5 is a view in side elevation of the exhaust line coupling and controlling valve mounted and carried thereon, a portion only of the exhaust line being shown.

Fig. 6 is a view in end elevation (top plan) of the valve carrying coupling of Fig. 5.

Fig. 7 is a sectional view of the valve taken on the line 7—7, of Fig. 5.

Fig. 8 is a longitudinal vertical sectional view, more or less diagrammatical, through an automobile, and showing one mounting and arrangement of heater of the invention mounted and installed in position thereon operatively coupled with the motor exhaust line, and further showing an arrangement of operating or control mechanism for the valve of the invention.

A possible form and embodiment, as well as arrangement of the invention is presented in the accompanying drawings and described herewith purely by way of example and not of limitation and includes the heater or radiator 1 for mounting on a motor vehicle at and within the space to be heated therefrom and thereby. This radiator in the particular example hereof embodies a length of enclosed casing having laterally depressed sections to form a tortuous path therethrough from end to end thereof, the opposite ends of the radiator or heater 1 terminating and discharging into the transversely disposed headers 11 and 12. These headers are closed at one end and open at their opposite ends to receive the couplings 11ª and 12ª which are suitably externally threaded and carry the nuts 12ᵇ by which they may be mounted and secured in the desired position on and to a motor vehicle. The heater or radiator 1 so formed is in this instance, referring now to Figs. 3, 4 and 8 of the drawings, secured to and mounted on the dash board or wall D of a motor vehicle V within the space in the vehicle to the rear or back of the dash board occupied by the occupants of the front seat S of the vehicle. The heater is mounted in horizontally disposed position extending across dash board D with the couplings 11ª and 12ª extending forwardly through the dash board and the nuts 12ᵇ screwed onto these couplings against the dash board to tightly secure the heater or radiator 1 in position mounted on the board. This mounted position of the heater 1, is clearly shown in Fig. 8 of the accompanying drawings when considered in connection with Figs. 3 and 4.

In accordance with the invention the heater 1 mounted as above described, or at some other desired and suitable point on the vehicle V, is connected with and receives exhaust gases from the exhaust line or pipe E extending from the exhaust manifold M of the motor P of vehicle V, which exhaust pipe manifold and motor are arranged in the usual conventional or other desired arrangements in the vehicle and need no detailed explanation here. One header of heater 1 is coupled or connected with the exhaust line E by means of a pipe 20 extending from, in this instance header 11 and coupling 11ª to a coupling and valve unit 21 of the invention as will be clear by reference to Fig. 8 of the drawing. The opposite end header 12 is connected with the exhaust pipe E by means of a pipe 22 extending downwardly and rearwardly therefrom to and discharging into the exhaust line at a point 23 to the rear of the location of the coupling and valve unit 21 which is connected with header 11 by the pipe 20. In this manner the heater or radiator 1 is coupled into and forms a part of a by-pass from the exhaust line so that exhaust gases can be forced to pass from exhaust line E through coupling 21, by pipe 20 into and through heater 1, and then discharged from the heater into pipe 22 by which they are returned and discharged into the exhaust line E at the point 23 for passage through the line to the usual exhaust point to atmosphere.

The invention provides by the coupling and valve unit 21 for closing the exhaust line E at coupling 21 and deflecting or forcing the exhaust gases to pass through the coupling 21 into the intake pipe 20 of the heater 1. Referring now to Figs. 5, 6, and 7, this unit 21 embodies a semi-cylindrical plate or base member 24 for fitting over and against one side of the exhaust pipe or line E, the exhaust line E being cut away to provide and enlarge said port or opening E' through the upper, rear side thereof, as will be clear by reference to Fig. 5 of the drawings in particular. The plate or base 24 of unit 21 fits over and is clamped or otherwise tightly secured to the exhaust line over and closing the port or opening E'. An off-take or outlet pipe 25 extends outwardly from and as a part of plate or base 24, opening therethrough and into communication with the exhaust pipe E through the pipe opening or port E'. At the juncture of the off-take 25 with the base plate 24, this plate 24 is formed with an outwardly curved enlargement or bulge 26, the radius of curvature of which is formed around a point mid-way of the inner edges of the port E', and preferably along the longitudinal center of the exhaust pipe E. A valve 27 of the gate type is provided for mounting on and within the unit 21, and in this instance valve 27 takes the form of a curved plate having the opposite arms 28 terminated at their upper ends in the stub shafts or trunnions 29, it will be clear by reference to Fig. 7 of the drawings. This valve so formed is mounted in the unit 21 in position across and within the exhaust pipe E at the opening E' thereof by means of the trunnions 29 journalled therein and in the opposite side edge portions of the base plate 24 of the unit. Thus the valve is rotatably mounted and can be swung to positions either across and closing the exhaust line as shown in Fig. 5 of the drawings, or laterally removed from the exhaust line across and closing the off-take pipe 25. It will here be noted that due to the mounting and formation of the valve 27 with the opposite arms 28 and trunnions 29, no structure other than the valve can traverse or extend across and obstruct the exhaust pipe, so that in position of the valve closing the off-take 25 and opening the exhaust line E, the exhaust line is unobstructed. Further by this construction and arrangement, the mounting of the valve is not directly subjected to the high temperatures of the exhaust gases and products of combustion passing through the exhaust line. By the curved formation of valve 27, when in closed position across the exhaust line, materially aids and assists in directing the gases from their flow through the exhaust line, laterally and outwardly through the off-take pipe 25, and in this manner resistance is materially lessened while the flow of gases is materially facilitated.

Operating mechanism for the valve 27 of the unit 21 is provided through the medium of which an occupant of the vehivle V can open and close the exhaust line and off-take 25 of the valve unit. In Fig. 8 of the drawings, one possible form of such mechanism is shown and embodies a push and pull rod 8 having an operating head 8' above the floor or foot boards of the vehicle, extends slidably and downwardly through this floor to and is pivotally coupled at its lower end with a lever arm 9 fixed to one of the stub shafts or trunnions 29 on which the valve 27 is rotatably mounted. Thus by raising or lowering rod 8, the valve 27 can be swung to position across and closing the exhaust line to direct gases laterally therefrom into the off-take 25, or can be swung upwardly to position across and closing the off-take while opening the exhaust line to permit normal flow of the gases therethrough.

In operation and use, referring now to Fig. 8, the pipe 20 is connected at its lower end into the off-take pipe 25 of the valve unit 21 to thus place the heater 1 in communication with the off-take 25 and the exhaust line E. When it is desired to operate heater 1, the valve is swung by rod 8 downwardly to position across and closing the exhaust line E as shown in Fig. 5. In this position of the valve, the exhaust gases passing into the line E from the exhaust manifold M or motor P are directed laterally through the opening E' into the off-take 25, from which they pass by pipe 20 into and through heater 1, and then back to the exhaust line by the return pipe 22. The gases passing through the tortuous passage of heater 1, thoroughly and rapidly heat the same and cause heating of the air in the space in which heater 1 is located. When it is desired to run the heater 1 inoperative and cut the same off, valve 27 is swung upwardly by lever 8 to position across and closing off-take 25, and is removed from position closing exhaust line E so that the gases pass therethrough in the normal manner. In all positions of the valve, its pivotal mounting is removed from the direct path of the gases and the destructive action thereof, while at the same time unobstructing the exhaust line E and the free uninterrupted flow of gases therethrough.

The apparatus of the invention as above described can be readily installed or removed from a vehicle and its exhaust line, while the heater 1 can be located at any desired position on and in a vehicle. The simplicity of the structure renders it of high efficiency in operation and with a minimum possibility of breakage or failure, while also permitting manufacture at relatively small cost.

It is also evident that various modifications, substitutions, variations and changes might be restorted to without departing from the spirit and the scope of my invention, and hence I do not wish to limit myself to the exact and specific disclosures hereof.

Desiring to protect my invention in the broadest manner legally possible, what I claim is:

1. In combination with a motor exhaust line having a lateral discharge opening therethrough, a valve unit embodying a substantially semi-cylindrical base member fitting against the exhaust line over and across the lateral opening therethrough, an off-take from the base member in communication with the exhaust opening through the base member, and a valve operably mounted in the exhaust line and base member adapted to be positioned to close the exhaust line and to open the off-take, or to close the off-take and to open the exhaust line, said valve being curved so that in the position closing the exhaust line it directs the gases laterally from the line into the off-take with minimum resistance.

2. In combination with a motor exhaust pipe having a lateral discharge opening therethrough, a valve unit embodying a base member fitting against the exhaust pipe over and across the lateral opening, an off-take from the base member in communication therethrough with the exhaust pipe opening, and a valve operatively mounted in position across the exhaust line and base member, the said valve embodying spaced alined stub shafts journalled in and extending through opposite sides of the exhaust line and base member.

3. In combination with a motor exhaust pipe having a lateral opening therethrough, a valve unit embodying a base member secured to the pipe over and across the lateral opening, an off-take from the base member and in communication therethrough with the exhaust pipe opening, and a valve mounted in and extending across the exhaust pipe, said valve formed with opposite side arms extending therefrom, trunnions at the outer ends of said arms extending laterally and outwardly therefrom, said trunnions journalled in opposite side edges of the lateral opening through said exhaust pipe, said base member fitting over and receiving said trunnions, the said valve being so mounted as to be swingable laterally to position across and closing the off-take to open the exhaust line, or swingable to position across and closing the exhaust line to open the off-take and direct gases laterally from the exhaust pipe to the offtake.

4. In combination with a motor exhaust pipe having a lateral discharge opening therethrough, a valve unit embodying a base member secured to the pipe over and closing the lateral opening, an offtake from the base member in communication therethrough with the exhaust pipe opening, and a valve mounted in and extending across the exhaust pipe, said valve being curved to direct gases laterally from the pipe into the offtake and having opposite side arms extending therefrom, trunnions at the outer ends of said side arms extending laterally and outwardly therefrom, said trunnions journaled in slots formed through the opposite side edges of the pipe opening, said base member formed with opposite edge slots fitting over and receiving said trunnions to retain the valve in journaled position, the base member being curved outwardly across the offtake to conform to and receive the curved valve when the valve is swung into a position laterally across and closing the opening through the base member and the offtake.

Signed at Anoka, county of Anoka, State of Minnesota, this 5th day of April, 1927.

EMIL VAN HOLLEN.